United States Patent
Gruett et al.

(10) Patent No.: US 8,945,384 B2
(45) Date of Patent: Feb. 3, 2015

(54) SYSTEM FOR FLUID TREATMENT HAVING FLUID RELEASE CYCLE

(75) Inventors: Kurt Gruett, Combined Locks, WI (US); Guy Gruett, Neenah, WI (US)

(73) Assignee: Water-Right, Inc., Appleton, WI (US)

( * ) Notice: Subject to any disclaimer, the term of this patent is extended or adjusted under 35 U.S.C. 154(b) by 704 days.

(21) Appl. No.: 13/151,492

(22) Filed: Jun. 2, 2011

(65) Prior Publication Data

US 2012/0305488 A1  Dec. 6, 2012

(51) Int. Cl.
*B01D 24/00* (2006.01)
*C02F 1/42* (2006.01)
*C02F 1/00* (2006.01)
*C02F 1/28* (2006.01)
*B01J 49/00* (2006.01)
*B01J 49/02* (2006.01)
*C02F 1/74* (2006.01)
*C02F 101/10* (2006.01)
*C02F 101/20* (2006.01)

(52) U.S. Cl.
CPC . *C02F 1/42* (2013.01); *C02F 1/008* (2013.01); *C02F 1/28* (2013.01); *B01J 49/0095* (2013.01); *B01J 49/02* (2013.01); *C02F 1/281* (2013.01); *C02F 1/283* (2013.01); *C02F 1/74* (2013.01); *C02F 2001/425* (2013.01); *C02F 2101/101* (2013.01); *C02F 2101/203* (2013.01); *C02F 2209/005* (2013.01); *C02F 2201/005* (2013.01); *C02F 2303/16* (2013.01)
USPC ............ 210/269; 210/275; 210/277; 210/278

(58) Field of Classification Search
USPC .................... 210/269, 275, 277, 278
See application file for complete search history.

(56) References Cited

U.S. PATENT DOCUMENTS

| | | |
|---|---|---|
| 3,151,064 A | 9/1964 | Lathrop |
| 4,385,992 A | 5/1983 | Clauer et al. |
| 4,659,463 A | 4/1987 | Chandler et al. |
| 4,885,084 A | 12/1989 | Doyle |
| 4,966,692 A | 10/1990 | Overy |
| 5,096,596 A | 3/1992 | Hellenbrand et al. |
| 5,628,899 A | 5/1997 | Vaughan |
| 5,660,721 A | 8/1997 | Kyriss et al. |
| 5,919,373 A | 7/1999 | Naaktgeboren |
| 6,129,836 A | 10/2000 | Grayson |
| 6,206,042 B1 | 3/2001 | Channell et al. |
| 6,263,908 B1 | 7/2001 | Love et al. |
| 6,325,943 B1 | 12/2001 | Kohlenberg |
| 6,402,944 B1 | 6/2002 | Vaughan |
| 6,444,127 B1 | 9/2002 | Vaughan et al. |
| 6,627,070 B1 | 9/2003 | Frank |
| 6,644,349 B2 | 11/2003 | Scanlan et al. |
| 7,300,569 B2 | 11/2007 | Petty |
| 7,488,424 B2 | 2/2009 | Gruett et al. |
| 7,491,321 B1 | 2/2009 | Maas et al. |
| 7,563,361 B2 | 7/2009 | Gruett et al. |
| 7,563,362 B2 * | 7/2009 | Jeong ........................ 210/143 |
| 7,638,063 B1 | 12/2009 | Maas et al. |
| 7,722,760 B2 | 5/2010 | Griesbach |
| 8,500,999 B2 | 8/2013 | Tischendorf et al. |
| 8,691,091 B2 | 4/2014 | Prescott |
| 2009/0178555 A1 | 7/2009 | Crits et al. |

* cited by examiner

*Primary Examiner* — Chester Barry
(74) *Attorney, Agent, or Firm* — Ryan Kromholz & Manion, S.C.

(57) ABSTRACT

A method and system for fluid treatment that provides fluid release cycles within the regeneration sequence of a fluid treatment device. The fluid release or backwash air cycle permits the slow, controlled and metered release of air or gases from a treatment tank.

6 Claims, 6 Drawing Sheets

Fig. 7
SERVICE

Fig. 8
BACKWASH

SYSTEM FOR FLUID TREATMENT HAVING FLUID RELEASE CYCLE

BACKGROUND OF THE INVENTION

The present invention relates to methods for fluid treatment that use ion exchange or filtering processes to treat the fluids. In particular, the present invention relates to methods and systems that provide a fluid release cycle that precedes a selected cycle in the regeneration of a fluid treatment device or system. Fluid filtering and fluid softening processes are becoming more and more common processes and are used in all different situations and environments, from industrial and municipal installations, to individual water filtration systems for homes and houses.

Many of these fluid treatment processes are air chamber, ion exchange and/or micronizer processes that regenerate ion exchange media and/or filter media beds used during the fluid treatment. In some environments, the fluid to be treated contains gas that is released during the treatment process. Regeneration fluids are passed through the bed of depleted ion exchange media or saturated filter media during which ions may be exchanged in the case of a water softener or precipitated in the case of a filter media. As used herein, the terms "ion exchange media" and/or "filter media" and/or "media" are defined broadly to include, as examples, resins, and zeolites, natural and synthetic types of both, carbon and activated carbon, activated alumina, and any other amorphous or microcrystalline structures commonly used in exchange and/or filtering processes. Regenerates for the media also cover a broad spectrum of compounds, including potassium permanganate, potassium chloride, hydrogen peroxide, sodium chloride, or any other chemical or compound used to recharge, reactivate, oxidize, or rejuvenated a media bed. A common ion exchange media includes high capacity ion exchange resin.

Current processes and systems for use allow for basic programming of a regeneration cycle to be undertaken during an ion exchange or media regeneration process. Generally, a regeneration cycle will include one or more steps of backwashing the ion exchange or filter media, regenerating the media, rinsing the media, and servicing the media. Current systems and devices allow for individual cycles to be programmed into the system or device. However, there are no known devices in the prior art that allow for an additional fluid release cycle to be programmed and operated independently of the backwashing cycle of a water treatment system, and especially within a residential treatment system. Such a system, with the additional fluid release backwashing cycle, would be an advantage over the prior art.

SUMMARY OF THE INVENTION

The present invention provides systems and methods for fluid treatment systems, including residential water treatment systems, which allow an additional regeneration cycle in addition to the backwashing cycle of the fluid treatment device. Thus, an additional backwashing cycle is available within the same system, which has independent steps from the traditional backwashing cycle. The additional backwashing cycle, referred to herein as backwash air allows for the slow and controller release of air and/or gases (e.g. fluid) from the system.

In some fluid treatment systems, it common to remove high levels of sulfur and iron commonly found in well water. The media bed works in combination with an air chamber within a tank to oxidize and filter the elements that cause sulfur and iron. At a programmed or preselected time, the system will regenerate using ordinary water to backwash the system clean of sulfur, iron and other well water contaminants.

In other exemplary fluid treatment systems, mirconizers are used to draw air into the system. A micronizer is typically located in-line and up stream of the treatment system and is used to add additional air and help oxidize other contaminates or ions in the incoming untreated water. The micromizer includes a venturi that draws air into the system as treated water is consumed from the system to which it is attached. Like air chamber systems, the air drawn in by a micronizer can be trapped in the treatment tank.

In yet further applications, untreated fluid or water may contain natural gases, such as methane gas. As the untreated water enters the system, the gases can build a head of gas in the treatment tank. The head of gas builds naturally in the tank without its introduction through any upstream opening or orifice in the system or connected components.

The system may also utilize, in combination with the ion exchange media found in traditional water softening systems, an air-injection system to oxidize sulfur and iron into precipitates that can be easily filtered and removed from the system. These systems, as well as others described above are commercially available.

A drawback of these types of systems is that when the system begins its regeneration cycle, the volume of air or gas under pressure in the treatment tank is the first fluid to be released from the tank. As the system control valve moves from the service position to the backwash position, the pressurized air and/or gas and water rapidly escape from the treatment tank. The rapid release of a high volume of pressurized air and/or gas and water can cause turbulent flow in the system drain line. The rapidly released air and/or and water may cause the drain line physically move or in some instances whip and thrash around. If the drain line is not properly secured, it may even come loose and cause water damage to the environment surrounding the fluid treatment system. The rapid and uncontrolled release of excess air and/or gases can also cause the media within the treatment tank to be backwashed from the system. In severe cases, the media bed is flushed from the treatment tank, through the control valve and through the drain line. This situation not only affects the efficacy of the water treatment system by depleting its media bed, but may also effect the performance of the control valve and drain lines.

The present invention provides a system and method for slowly opening the control valve from a preselected position such as the service cycle or position to the backwash cycle or position thereby allowing the pressurized air and/or gases and water in the treatment tank to slowly escape. This slow, controlled release of air and/or gases substantially eliminates the turbulent or violent flow within the drain line. Thus the drain line remains intact, secured and unclogged to allow the system to drain properly during each regeneration cycle.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention.

The present invention provides systems and methods comprising of an additional fluid release cycle during regeneration operations for treating and monitoring fluids in a fluid treatment apparatus, such as a residential or commercial water treatment system. The invention allows for a modified, additional or alternate backwash cycle to be incorporated in a single fluid treatment apparatus and method. For instance, the present invention allows a water filtering or softening system that runs on a programmed regeneration sequence to be programmed for an additional backwash air cycle that runs on a timed regeneration sequence. The additional backwash air cycle is activated after a regeneration command is received by the control valve. When referring to the specific operations of the present invention, each of the individual cycles of operation, such as backwash, brine draw down, brine draw up, softening, filtering, rapid rinse and brine refill, will be referred to as a cycle or stage, with the overall cycles being referred to as regeneration sequences. Backwash air refers to the new additional cycle. The use of such language is used for clarification purposes and should not limit the scope of the invention in any manner.

Each of the individual cycles and the overall regeneration sequence is programmed to last or run for a specified duration or time. Duration is defined as any variable to measure a length or magnitude, such as a volume (gallon, liter), time (hour, day, week) number of cycles (10 cycles, 3 cycles), strength of regenerate solution (parts per million or chemical strength) or other variable to measure the fluid passing through the system. The duration of each cycle or the duration of a regeneration sequence may vary.

Figure 1:
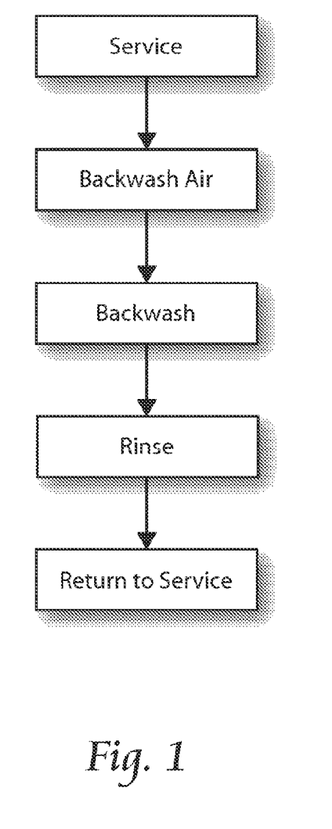
FIG. 1 is flow chart depicting stages and cycles that may be used in conjunction with the present invention.
Figure 2:
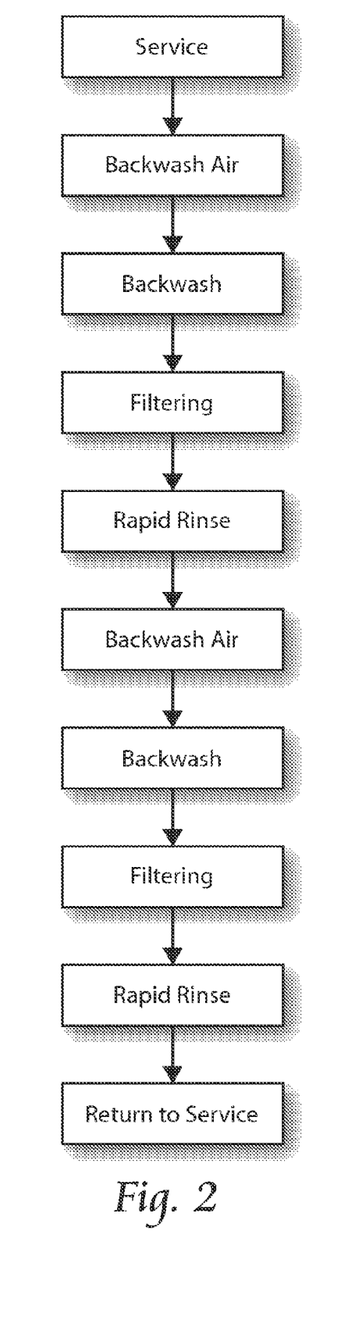
FIG. 2 is an alternate flow chart.
Figure 3:
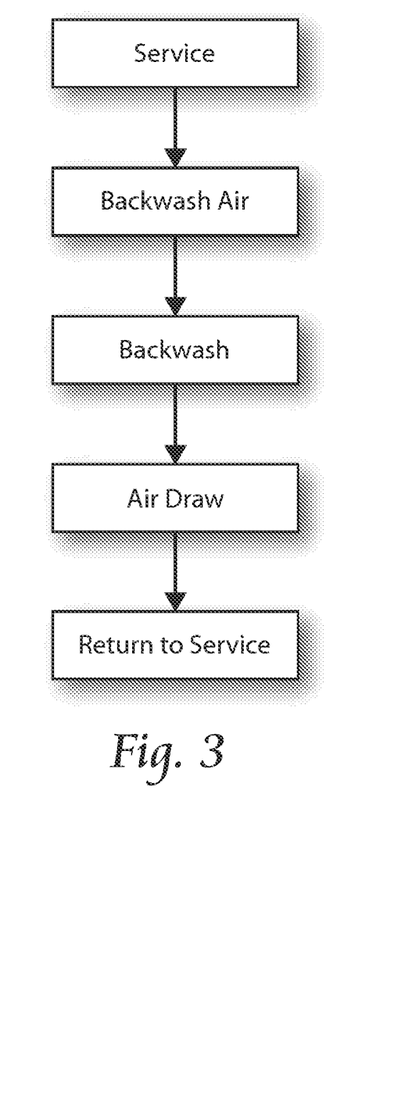
FIG. 3 is another alternate flow chart.

FIG. 1 shows a general flowchart for a typical filter sequence program. This sequence may be used in a system designed to remove particulate from an untreated water source. FIG. 2 shows a general flowchart for a typical acid neutralizing regeneration sequence. FIG. 3 shows a general flowchart for a typical sulfur and iron filtration regeneration sequence. On a typical fluid treatment system that incorporates the present invention, an operator will be able to program the regeneration cycles within the sequence. The operator first selects the order of the regeneration cycles within the regeneration sequence. That is, the regeneration sequence is programmed to determine which individual cycles or stages will make up the regeneration sequence. Next, the operator will set the operating parameters for each of the cycles used in the regeneration sequence, with the duration of operation of each cycle also being entered. In each of the exemplary sequences shown in FIGS. 1-3, the second cycle is the fluid release or backwash air cycle. It is to be understood however that any of the cycle positions could be a fluid release or backwash air cycle. This cycle is not limited to the second cycle in a regeneration sequence. The fluid release cycle allows a control valve on the fluid treatment apparatus to move at a slow, metered and controlled rate of speed from any cycle to the backwash air cycle. This allows any pressurized air and/or gases and water in the system to slowly escape. In other words, the system is slowly depressurized so that a turbulent or violent flow of water and air and/or gases is not imparted through the system drain line.

Referring again to FIGS. 1-3, the number of specific cycles could be altered for any of the softening or filtering sequences. The cycles may be determinative by volume and/or time; the first or service cycle may run for 1,500 gallons of fluid passing through the system, whereby the second cycle, backwash air would run for ten minutes. Similarly, the first cycle may run after a time period (e.g., 1 week) or an amount of contaminants in the system (e.g., more than 75%). The system is capable of using any of these variables as a triggering function to commence a regeneration sequence.

Figure 4:
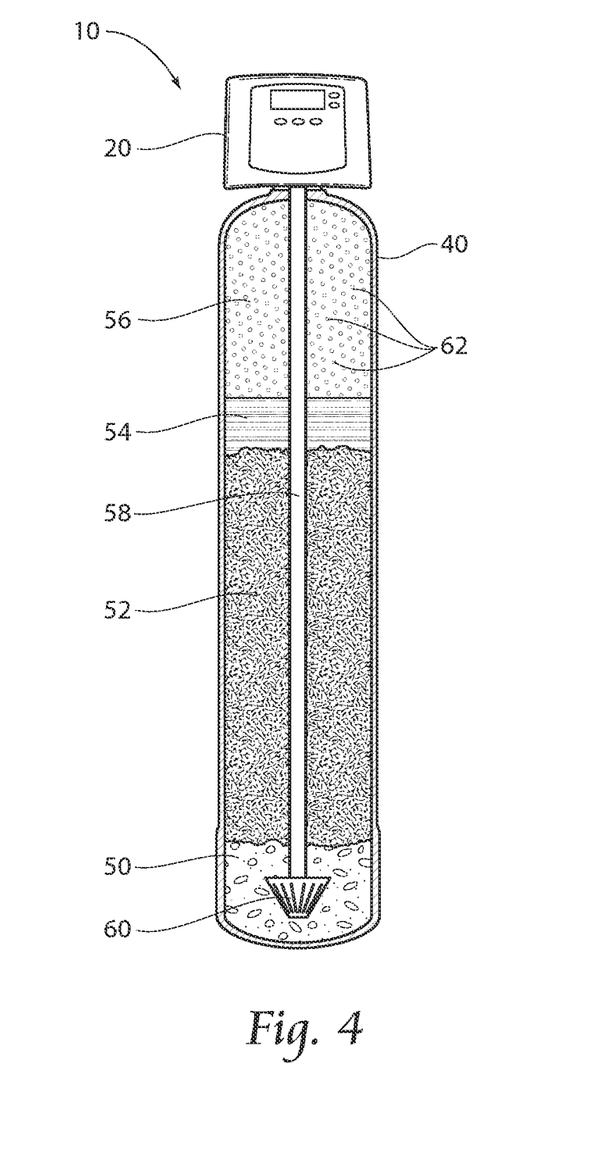
FIG. 4 is a partially cut away front elevation view of the control valve and treatment tank of the present invention.
Figure 5:
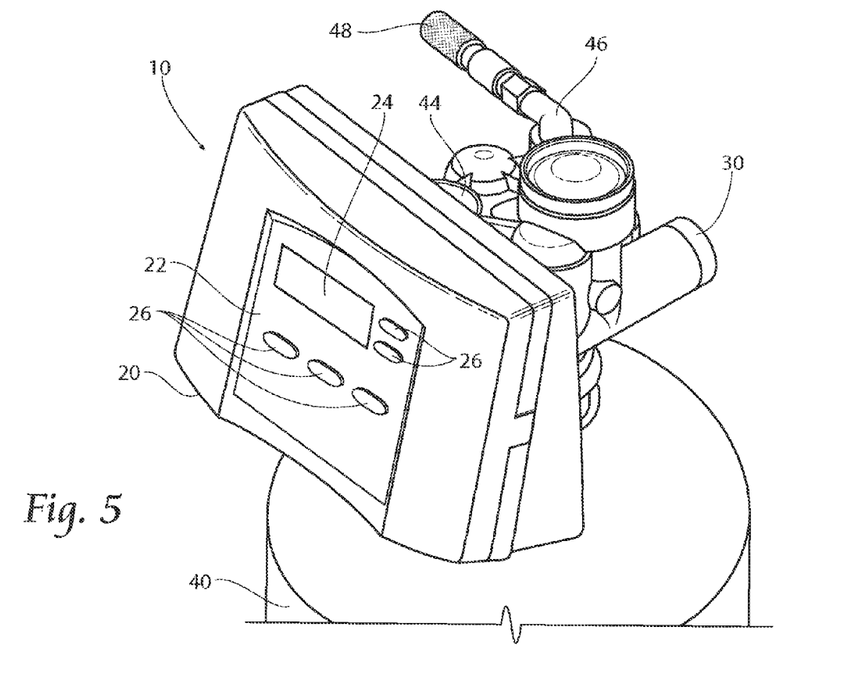
FIG. 5 shows a front perspective view of an apparatus that incorporates the present invention.
Figure 6:
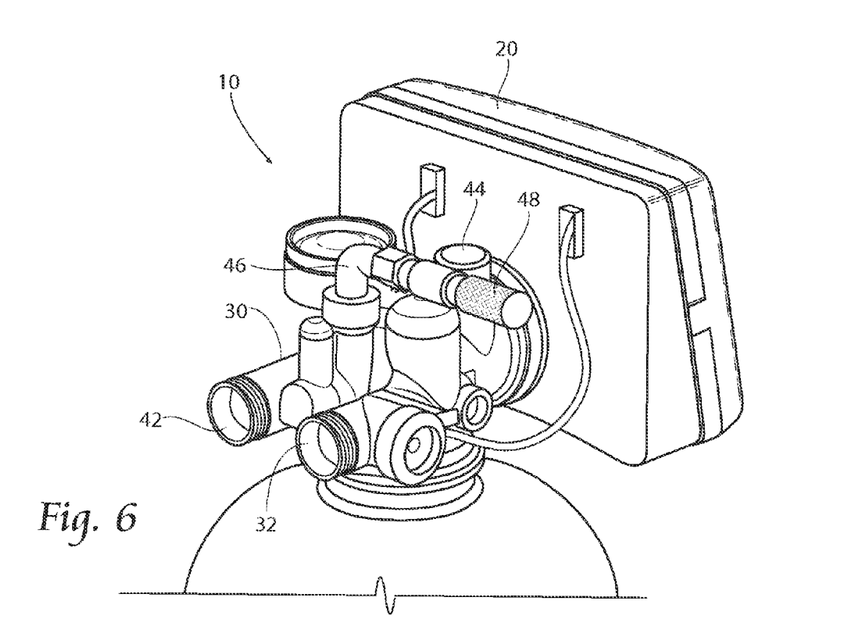
FIG. 6 shows a rear perspective view of the apparatus of FIG. 5.

While the present invention may be embodied and employed in any of several fluid treatment apparatuses, examples of such apparatuses can be seen in the following drawings. FIGS. 4-6 show an air chamber water treatment system 10. Referring to FIG. 4, the system 10 has a programmable controller 20 and valve 30 (see FIGS. 5 and 6) that are supported on a treatment reservoir or tank 40. Quartz gravel underbedding 50 or an equivalent media is placed in the bottom of the tank 40. Above or on top of the underbedding 50 is an ion exchange or filter media. The tank 40 is partially filled with water 54 so that the water preferably occupies between ⅔ and ¾ of the tank 40 by volume. An air charge or gas charge region 56 is formed between the upper water level and the top of the tank 40. A draw tube or pipe 58, including a strainer 60 on its lower most end extends from the underbedding 50 to the valve body 30. The conical strainer 60 prevents the non-fluid contents of the tank 40 from being drawn up through the tube or pipe 58.

During the service or filtration process in an air chamber system, water is passed through the control valve 30 and sprayed 62 into the tank 40. The precipitates formed by the spraying process are filtered from the water as both pass through the media bed 52. Filtered water is withdrawn from the tank 40 through the draw tube 58 while the contaminants are trapped within the media bed 52. After a predetermined period of time or after a predetermined amount of water has passed through the media bed 52, the system must be cleaned or recharged. In this condition, the system initiates a regeneration cycle.

If a micronizer is employed in the system or natural gases are present in the untreated water passing through the system, the air introduced by the micronizer or the gases present in the water pass through the control valve 30 and into the tank 40. Unlike the air chamber system where the tank 40 is only partially filled with water, the excess gases 56 that build up in the upper region of tank 40 in a micronizer system or with the presence of natural gases in the system actually displace water from the tank 40. In the case of the micronizer, this process also enhances the oxidation of the contaminants in the water to form precipitates.

Now referring to FIG. 5, the controller 20 has an interface 22, which provides an area for a display screen output 24, which is capable of displaying the flow charts depicted in FIGS. 1-3. The controller 20 also has various buttons 26 that allow the cycles of the sequence to be programmed for the system 10. Two exemplary individual cycles are depicted passing through the multiple configurations of the valve body 30 in FIGS. 7 and 8.

The valve 30 is best shown in FIGS. 5 and 6. Valve 30 includes inlets and outlets to connect the system 10 to an untreated water or fluid source, a chemical source and/or air source and the treatment tank 40, as well as a treated water or fluid output that is fed by the system 10. The valve 30 is depicted as exemplary of any of several valve configurations that are known and used in the art and should not be considered limiting to the present invention. The valve 30 may be modified depending on the specific needs for an individual treatment system.

Figure 7:
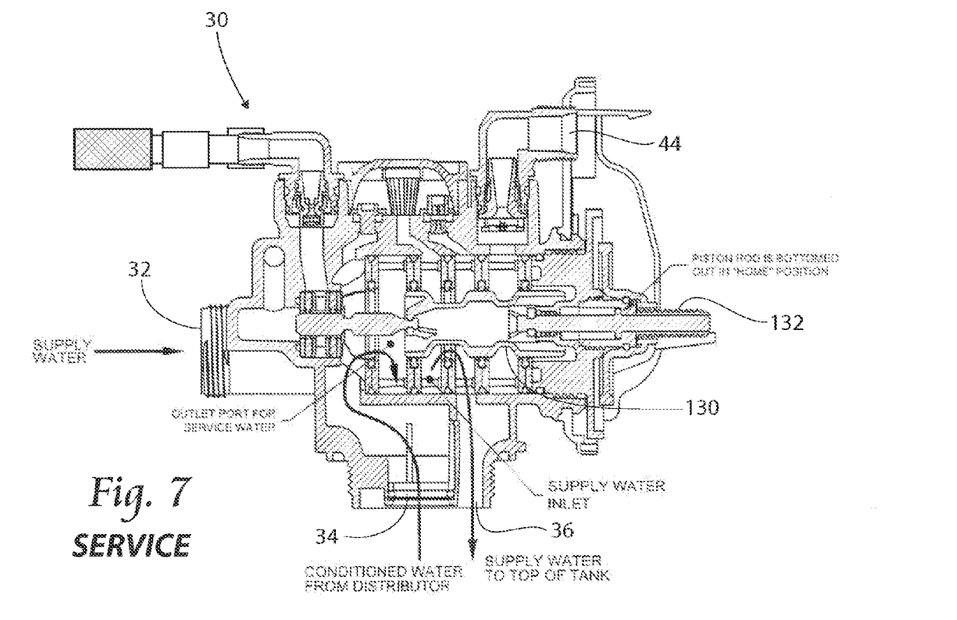
FIGS. 7 and 8 provide various exemplary flow patterns through a valve body used in connection with the present invention.
Figure 8:
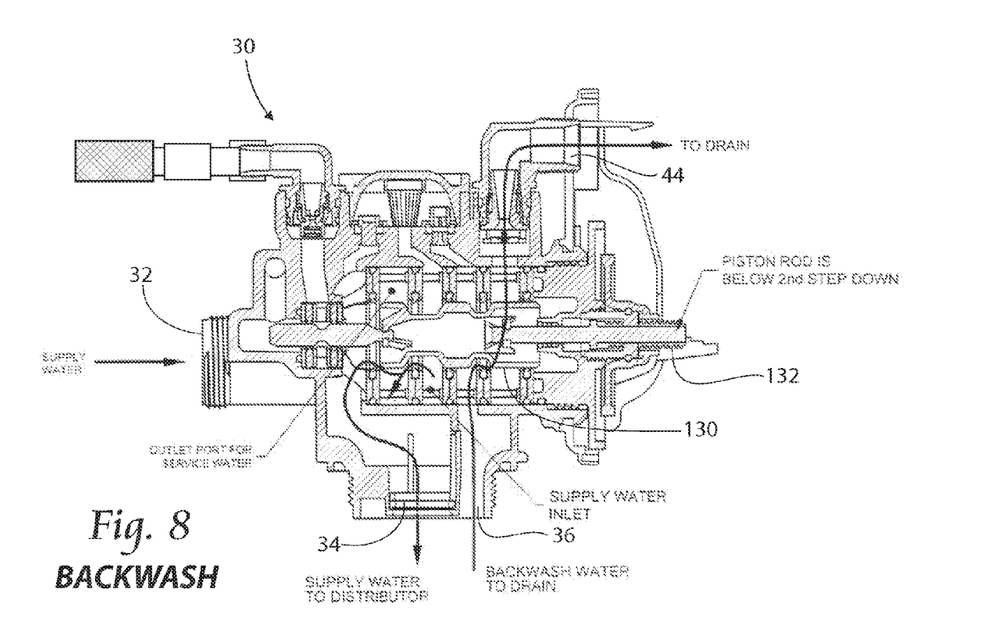

The valve 30 has a fluid inlet 42, which allows untreated water into the valve 30 and a fluid outlet 32 for treated water, which are best shown in FIG. 6. As shown in FIGS. 7 and 8, inlet/outlet 34 is connected to the tank 40 (through the draw tube or pipe 58 as shown in FIG. 4) and allows fluid to be brought into the valve 30 and circulated through the valve body. An outlet 36 is also connected to the reservoir or tank 40 and allows fluid to flow from the valve body 30, depending on which specific cycle is being performed at a given time. Referring again to FIGS. 5 and 6, a second fluid outlet or drain 44 is provided for various cycles to purge used or spent fluid from the system 10. The arrows in the various Figures indicate which of these inlets/outlets will be used for each of the various cycles. In an air system, an air inlet 46 is formed in the valve body 30 and typically includes a filter or screen 48. As an alternative method of introducing air into the system, a micronizer may be installed in-line and upstream of the untreated water inlet. The micronizer, which would be installed upstream of inlet 42, draws air into the system 10 as treated water is expelled from the system.

The valve 30 is a piston type fluid treatment valve that is known in the art. The valve shown in FIGS. 5-8 is manufactured by the Clack Valve Corporation of Windsor, Wis. The valve is described in U.S. Pat. Nos. 6,776,901; 6,444,127 and 6,402,944; each incorporated herein by reference. As shown in FIGS. 7 and 8, a valve piston 130 is mounted on a piston rod 132. The valve piston 130 moves within a valve body 30 having multiple openings or passageways for fluid flow. An electric motor drives a series of gears or gear train. The direction of rotation of the motor as well as the duration that the motor runs and drives the piston to the desired location within the valve body defines a predetermined passageway for fluid flow. In this embodiment, the rotational motion of the electric motor is converted into reciprocal motion by the gear train to move the valve piston 130 within the valve body 30.

Figure 9:
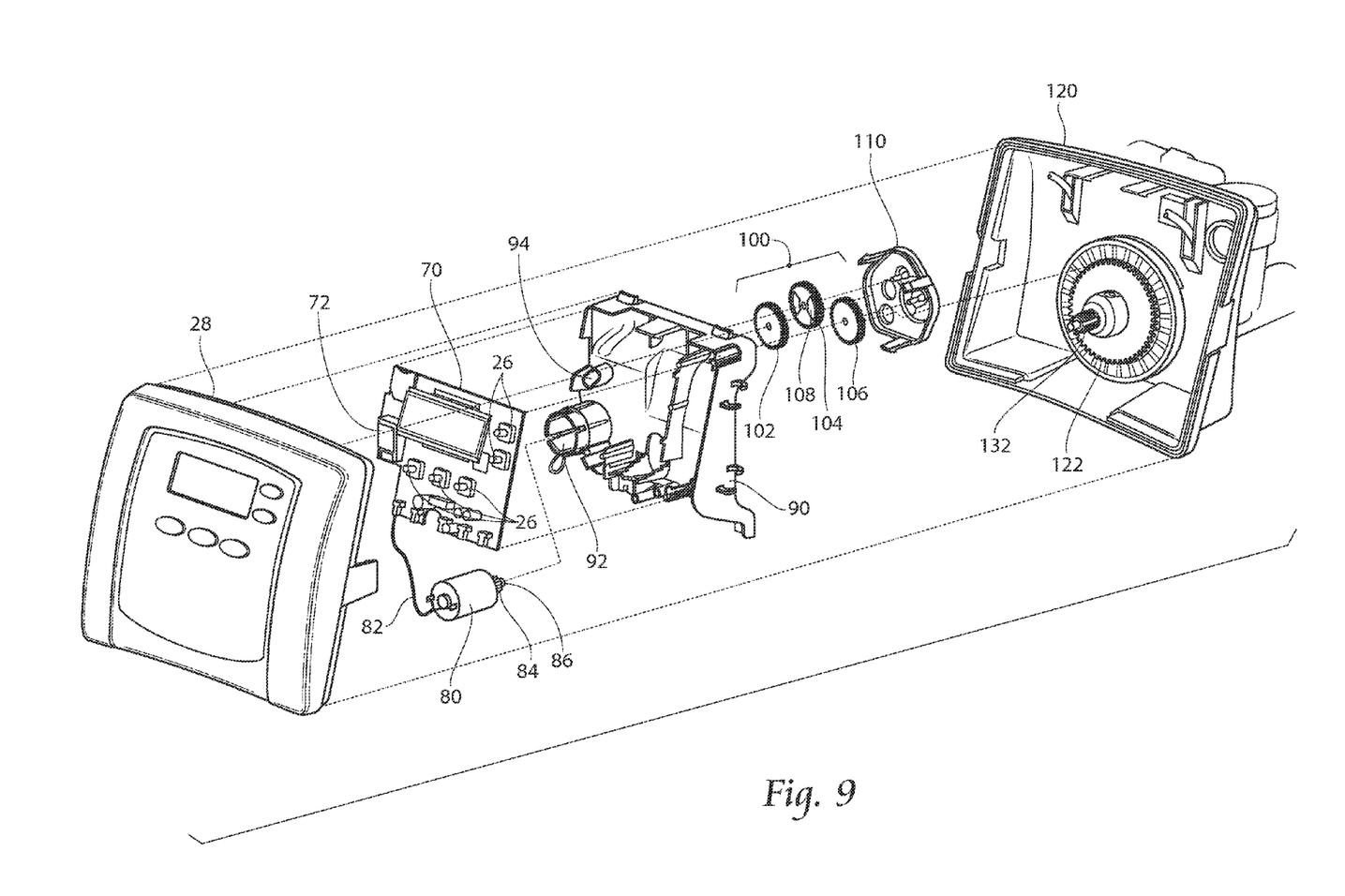
FIG. 9 is an exploded perspective view of an apparatus that incorporates the present invention.

FIG. 9 is an exploded view the cover 28 of the controller 20, the circuit board 70, the motor 80, the mid plate 90, gear train 100 (including gears 102, 104, 106), gear bracket 110 and back plate assembly 120. The electric motor 80 may comprise any of a number of reversible motors and preferably has variable torque capability. For instance, the motor 80 could be an asynchronous AC motor or a stepper motor. In our preferred embodiment, the motor 80 comprises a reversible electric DC motor. The motor is connected to the circuit board 70 of the controller 20 by wiring 82. The motor 80 is attached to the mid plate 90 by a receptacle 92. Stepper gear 102 mates with the pinion gear 84 affixed to the drive shaft 86 of the motor 80. The motor is mounted in the receptacle 92 such that the pinion 84 extends through the rear wall of the mid plate 90.

The gear train 100 may comprise any structure for transferring torque from the pinion 84 of the motor 80 to the driven gear 122. In our preferred embodiment, the gear train 100 includes first, second and third stepper gears 102, 104 and 106. Each gear has in input portion of a relatively large diameter and an output portion of a relatively small diameter. The first gear 102 has an input portion that is driven by the pinion 84. The first gear 102 drives the second gear 104 and the second gear 104 drives the third gear 106. The third gear drives the driven gear 122. The gear train 100 is rotatably supported within gear bracket 110 that is attached to the mid plate 90. Spindles formed in the gear bracket 110 support each gear 102, 104 and 106.

Figure 10A:
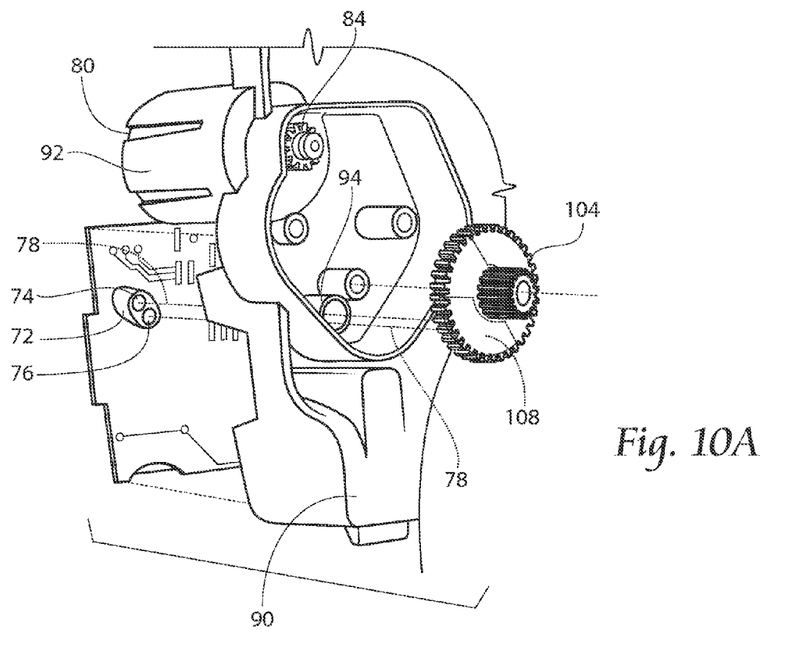
FIG. 10A is a partial exploded view of the apparatus of FIG. 9.
Figure 10B:
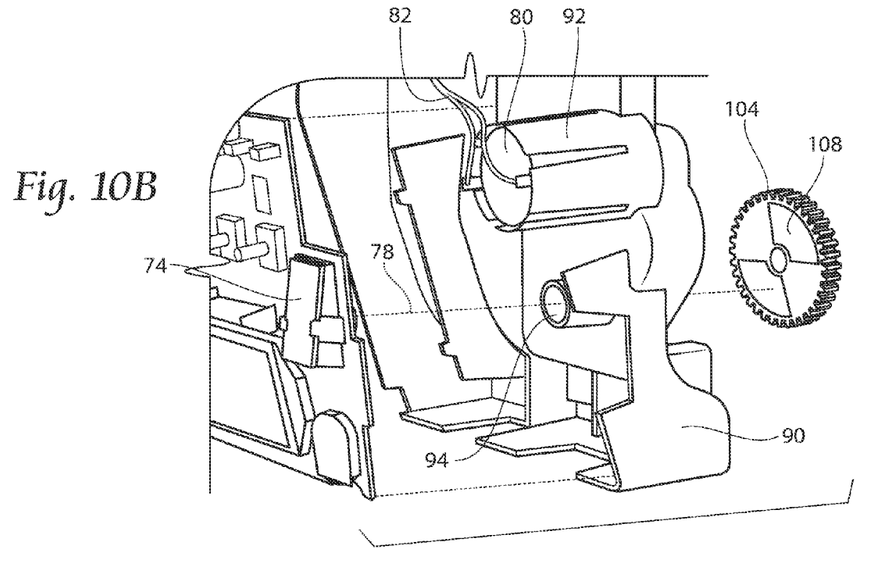
FIG. 10B is another partial exploded view of the apparatus of FIG. 9.

Referring to FIGS. 10A and 10B, the motor 80 is secured within the receptacle 92. As shown in FIGS. 9, 10A and 10B, an optic sensor 72 is attached to the circuit board 70. As best shown in FIG. 10A, optic sensor 72 has a light transmitting opening 74 and a light receiving opening 76. The light beam emitted by the sensor 72 is represented by dashed line 78. The light beam 78 passes through opening 94 in mid plate 90.

As shown in FIGS. 9, 10A and 10B, reflective material 108 is adhered to or formed in second gear 104. Reflective material 104 could be foil, reflective tape or any similar type of material. When light beam 78 is emitted from optic sensor 72, the light beam 78 passes through opening 94 and then strikes gear 104. If gear 104 is positioned such that the light beam 78 strikes the reflective material 108, the light beam is reflected back to the sensor 72. If the light beam does not strike the reflective material 108, no light is reflected back to the sensor 72.

The system works as follows. When the fluid treatment apparatus receives a signal from the controller 20 to begin a regeneration cycle, it is necessary to move the valve piston 130 within the valve body 30. For example, the valve piston 130 may be moved from the service position to the backwash position. This is known as a regeneration command. The controller 20 briefly powers the motor 80 (e.g. turns the power on and then turns the power off). This sequence may be repeated one, two or three times depending upon the valve design. At the same time the optic sensor 72 is activated. As the motor 80 imparts rotational motion from its pinion 84 to the gear train 100 for a very brief period of time, the optical sensor looks for an encoded pulse. An encoded pulse comprises a break in the light beam 78 transmitted from the transmitting opening 74 to the receiving opening 76. If the optic sensor 72 senses the pulse during the brief time period that the motor 80 is energized (which would be the last period of time the motor 80 is energized when the motor is energized multiple times in succession), a timer within the controller 20 is started. If no encoded pulse is sensed, the motor 80 is again powered for a very brief period of time. If a sensor 72 senses the pulse or break in the light beam 78, the timer is started. Once the timer starts, no additional power is sent to the electric motor 80 until the predetermined duration of time has elapsed. Once elapsed, the motor is again briefly energized once or for a predetermined number of successive times while the sensor again looks for another pulse. As this process continues, the valve piston 130 within the valve housing 30 is moved a minute amount each time the motor 80 is energized. In our preferred embodiment, the valve piston 130 is moved approximately one thousandths of an inch (0.001 inch) each time the motor is energized. In our preferred embodiment as the motor 80 is energized two, three or four successive times, the valve piston 130 is moved two, three or four successive times (or approximately 0.002 to 0.004 inches), the system is idle for thirty (30) seconds, the valve piston 130 is moved again three or four successive times, the system is idle for thirty (30) seconds, etc. This process is carried out for a predetermined time period of about six (6) minutes.

As will be apparent, this process can be repeated for a predetermined period of time or a predetermined number of times. As an alternate example, assuming the sensor 70 senses a pulse each time the motor 80 is briefly energized, the motor is energized so that the valve piston 130 opens approximately one thousandth of an inch, the valve piston 130 is stopped for 30 seconds, the motor is energized again so that the valve piston opens approximately one thousandth of an inch, the system is stopped, 30 seconds later the motor is again energized, and so on. This process is continued over a predetermined time period, for example a ten (10) minute time period.

Regardless of the sequence and duration of this air release or backwash air cycle, at its conclusion the valve piston 130 is moved a sufficient amount and over a sufficiently slow time period to allow the pressurized fluid (air and/or gas and water) within the tank 40 to be slowly and controllably released through the control valve 30 in a non-turbulent flow. As described above, this prevents the violent and turbulent flow of air and/or gas and water from the tank 40 through the drain 44 and its drain line.

The figures and description above merely exemplify the many different arrangements that may be incorporated into the present invention. Provided that a fluid release cycle can be accomplished and programmed within a single system, the system would fall within the present invention. In addition, the system may include a plurality of cycles either before or after the fluid release cycle. The system is designed for use in residential and commercial settings. Each of the sequences can have any desired number of cycles or steps that will effectively treat the water in the system and it may also be possible to incorporate other cycles if necessary. As stated, the system can also be used to monitor various parameters of the system, such as the volume of water passing through the system, the number of individual regeneration cycles run through the system, the chemical concentration within the system, and the time the system has been active or inactive. The system could be programmed so that a fluid release cycle or backwash air cycle will be activated after a certain amount of water has run through the system or after a predetermined period of time.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention.

We claim:

1. A system for treating water, said system comprising:
    a water treatment reservoir;
    an electronic programmable controller, said programmable controller capable of displaying visual indicators on an output display screen and capable of receiving input from a plurality of push buttons; and
    a valve body comprising:
        a first fluid inlet port;
        a second fluid inlet port;
        a first fluid outlet port;
        a second fluid outlet port; and
        a valve including a piston selectively longitudinally positionable by said programmable controller to direct fluid flow between said ports to execute a regeneration cycle comprising a service stage, followed by a backwash air stage, followed by a backwash stage;
    wherein said programmable controller and said valve body are coupled to and supported by said reservoir; and
    wherein said valve is configured to direct,
        while the piston is in a first static longitudinal position during the service stage, fluid flow from the first fluid inlet port to the water treatment reservoir and from the water treatment reservoir to the first fluid outlet port,
        while the piston is in a second static longitudinal position during the backwash stage, fluid flow from the first fluid inlet port to the water treatment reservoir and the first fluid outlet port and from the water treatment reservoir to the second fluid outlet port,
        while the piston is in a third static longitudinal position during the backwash air stage, the third static longitudinal position being located between the first static longitudinal position and the second static longitudinal position, fluid flow from the first fluid inlet port to the water treatment reservoir and from the water treatment reservoir to the second fluid outlet port.

2. A system according to claim 1 wherein the backwash air stage includes a plurality of time periods during each of which the piston is positioned at a different static longitudinal position between the first static longitudinal position and the second static longitudinal position.

3. A system according to claim 1 further comprising an optic sensor communicatively coupled to said programmable controller.

4. A system according to claim 3 wherein an encoded pulse detected by said optic sensor is used to control the rate at which fluid flows from said reservoir during the backwash air stage.

5. A system according to claim 3 wherein an encoded pulse detected by said optic sensor is used to control a time period at which said piston remains in the third static longitudinal position.

6. A system according to claim 2 wherein at least two of the time periods are different.

* * * * *